UNITED STATES PATENT OFFICE.

CARL BOSCH AND WILHELM WILD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF PRODUCING HYDROGEN.

1,200,805.  Specification of Letters Patent.  Patented Oct. 10, 1916.

No Drawing.   Application filed April 19, 1913.   Serial No. 762,344.

*To all whom it may concern:*

Be it known that we, CARL BOSCH and WILHELM WILD, citizens of the German Empire, residing at Ludwigshafen-on-the-Rhine, Germany, have invented new and useful Improvements in the Process of Producing Hydrogen, of which the following is a specification.

It is known that carbon monoxid and steam can be converted into carbon dioxid and hydrogen by means of catalytic agents, and that the reaction takes place with the evolution of heat, but in order to carry out the process on a practical scale it is necessary first to raise the apparatus to a temperature requisite to start the reaction. Even if the process be carried out in such a manner that the heat generated during the reaction is caused to heat up the gases about to enter the reaction chamber, variations of temperature occur when the process is carried out continuously, and it is consequently often necessary to supply to the apparatus, during the reaction, heat over and above that generated by the process. The heating of the apparatus from the outside presents various disadvantages, because not only is it difficult to regulate the temperature in the contact furnace with sufficient rapidity, but the apparatus suffers under the high temperatures employed.

We have found that the heat which is necessary to enable the reaction to be started and also to maintain the temperature for the reaction can be generated with great ease, by supplying oxygen to the gases when in contact with, or on their way to, the catalytic agent, the said oxygen entering into combination with the combustible gases and providing the required heat. Instead of pure oxygen, air can be employed in those cases where the presence of nitrogen in admixture with the hydrogen is not objectionable, for instance when the hydrogen obtained is to be employed for the catalytic production of ammonia. According to our invention, it is possible to supply the necessary heat in a most convenient manner and also to distribute the heat equally and thus maintain the temperature at the desired level. When water gas or other gas containing hydrogen and carbon monoxid is employed as a gas supplying carbin monoxid, and the oxygen introduced combines with a part of the hydrogen to form steam, the latter can again take part in the reaction, and consequently the amount of steam employed can be correspondingly reduced. We prefer to supply the oxygen, or the air, directly to the contact space and it can be supplied at one or more than one place as desired.

The process of the present invention can be carried out either with pure carbon monoxid or with carbon monoxid which is more or less diluted with other gases, and it is of particular use when it is desired to free a mixture of gases, such for instance as water gas, from carbon monoxid, since the conversion of the carbon monoxid into carbon dioxid sets free hydrogen which mixes with the hydrogen of the water gas. It is then only necessary to remove the carbon dioxid and any excess of steam, in order to produce pure hydrogen.

Our process offers great advantages when gases are employed which contain relatively little carbon monoxid, because, in this case, the heat of reaction is small and the difficulties incidental to supplying heat from the outside are consequently much exaggerated. Further in this case the supply of oxygen can be so regulated that, during the combustion, sufficient steam is formed to enable the whole of the carbon monoxid to be oxidized and consequently further addition of steam is not necessary.

Now what we claim is:—

1. The process of producing hydrogen by causing carbon monoxid and steam to react in the presence of a hot catalytic agent and passing oxygen into the catalytic chamber in order to produce heat by combustion in the said chamber.

2. The process of producing hydrogen mixed with nitrogen by causing carbon monoxid and steam to react in the presence of a hot catalytic agent and passing air into the catalytic chamber in order to produce heat by combustion in the said chamber.

3. The process of producing hydrogen by causing carbon monoxid and steam to react in the presence of a hot catalytic agent and maintaining the necessary temperature for the reaction by causing oxygen to combine with a combustible gas in the chamber containing the catalytic agent.

4. In the process of producing hydrogen by causing carbon monoxid and steam to react in the presence of a hot catalytic agent, the step which consists in causing oxygen to combine with a part of the introduced gas containing the carbon monoxid in the presence of the catalytic agent, thereby utilizing the heat of combustion to maintain the catalytic agent at a temperature suitable for the reaction between the steam and the carbon monoxid.

5. In the process of producing hydrogen by causing carbon monoxid and steam to react in the presence of a hot catalytic agent, the step which consists in supplying oxygen to a plurality of places in the catalytic chamber in order to produce heat by combustion in the said chamber.

In testimony whereof we have hereunto set our hands in the presence of two subscribing witnesses.

CARL BOSCH.
WILHELM WILD.

Witnesses:
J. ALEC. LLOYD,
JOSEPH PFEIFFER.